United States Patent
Imai et al.

(10) Patent No.: US 6,707,265 B2
(45) Date of Patent: Mar. 16, 2004

(54) ROTOR ANGLE DETECTING APPARATUS FOR DC BRUSHLESS MOTORS

(75) Inventors: Nobuyuki Imai, Wako (JP); Yutaka Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 62 days.

(21) Appl. No.: 10/075,245

(22) Filed: Feb. 15, 2002

(65) Prior Publication Data

US 2002/0149335 A1 Oct. 17, 2002

(30) Foreign Application Priority Data

Feb. 16, 2001 (JP) ........................ 2001-040446
Sep. 21, 2001 (JP) ........................ 2001-288303

(51) Int. Cl.[7] ............................................. H02P 6/08
(52) U.S. Cl. ................... 318/254; 318/138; 318/439; 318/805; 318/716; 318/720; 318/723; 318/724
(58) Field of Search ................ 318/493, 494, 318/254, 805, 823, 138, 439, 716, 723, 724, 720

(56) References Cited

U.S. PATENT DOCUMENTS

| | | | | |
|---|---|---|---|---|
| 5,565,752 A | * | 10/1996 | Jansen et al. | 318/807 |
| 6,069,467 A | * | 5/2000 | Jansen | 318/802 |
| 6,320,349 B1 | * | 11/2001 | Kaneko et al. | 318/798 |
| 6,462,492 B1 | * | 10/2002 | Sakamoto et al. | 318/254 |

* cited by examiner

Primary Examiner—Rita Leykin
(74) Attorney, Agent, or Firm—Arent Fox Kintner Plotkin & Kahn

(57) ABSTRACT

A rotor angle detecting apparatus for a DC brushless motor is capable of detecting the angle of the rotor of the DC brushless motor with accuracy without the need for a position detecting sensor. A motor controller has a high-frequency voltage imposer, an angle detector, a U-phase current sensor, and a W-phase current sensor for detecting the rotor angle of the DC brushless motor. The angle detector detects the rotor angle $\theta$ using a current value IU_s detected by the U-phase current sensor, a current value IW_s detected by the W-phase current sensor, and high-frequency components depending on high-frequency voltages vu, vv, vw, when the high-frequency voltages vu, vv, vw are imposed on command values VU_c, VV_c, VW_c for three-phase voltages by the high-frequency voltage imposer.

9 Claims, 4 Drawing Sheets

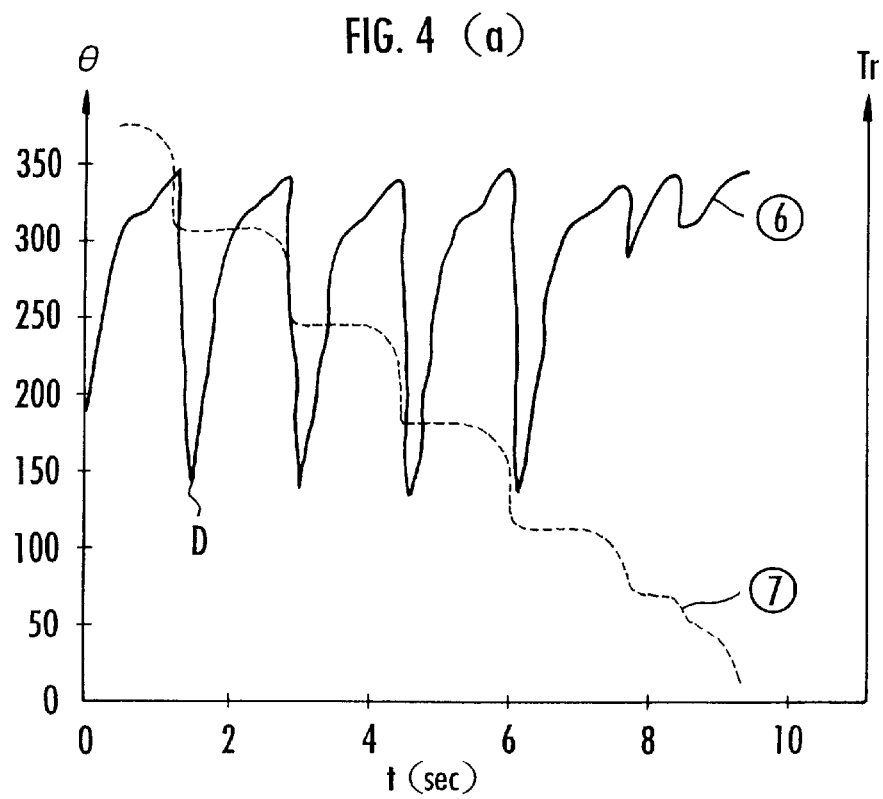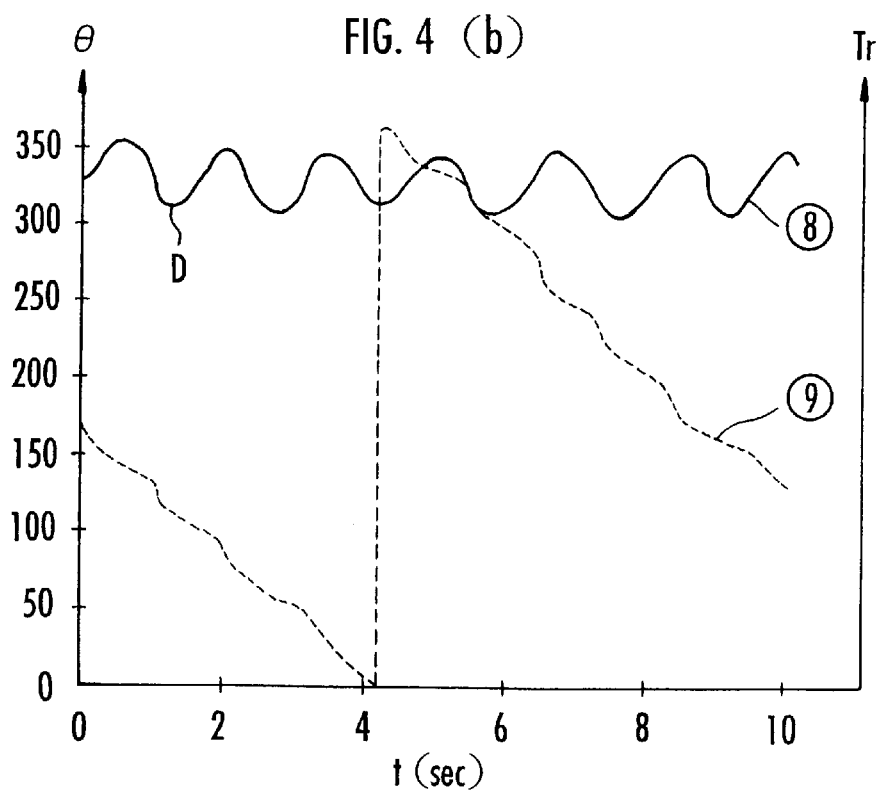

ROTOR ANGLE DETECTING APPARATUS FOR DC BRUSHLESS MOTORS

BACKGROUND OF THE INVENTION

1. Field of the Invention

The present invention relates to a rotor angle detecting apparatus for detecting the rotor angle of a salient-pole DC brushless motor.

2. Description of the Related Art

In order to energize a DC brushless motor to obtain a desired torque, it is necessary to apply a voltage to the armatures in a suitable phase corresponding to the electric angle (hereinafter referred to as rotor angle) of the rotor which has magnetic poles. Therefore, the DC brushless motor generally has a position detecting sensor for detecting the rotor angle.

The DC brushless motor with the position detecting sensor is required to have a circuit combined with the motor driver unit for receiving a detected signal which is outputted from the position detecting sensor, and wires between the position detecting sensor and the motor driver unit. There have been proposed various attempts to detect the rotor angle without the position detecting sensor so as to reduce the cost of the DC brushless motor and the motor driver unit by dispensing with the position detecting sensor.

According to one of the proposals, the voltage applied to the armatures of the DC brushless motor is divided into voltages on two orthogonal axes, and when a high-frequency alternating voltage is applied to one axis, a current generated on the other axis in response to the application of the high-frequency alternating voltage is detected thereby to detect the rotor angle. However, this approach is disadvantageous in that it takes some time in an initial startup stage before the detected rotor angle reaches an actual rotor angle and it is difficult to correct the rotor angle.

Another proposed technique uses a data table containing stored data representative of a correlation between rotor angles and armature currents when two- or three-phase currents are passed through the armatures of the DC brushless motor. Detected currents flowing through the armatures are applied to the data table, and approximating calculations are made on data in the data table to detect a rotor angle. Problems of this process are that errors tend to occur due to the effect of motor parameters that differ from motor to motor and the approximating calculations.

SUMMARY OF THE INVENTION

Basic principles of the present invention will first be described below with reference to FIGS. 1(a) and 1(b) of the accompanying drawings. As shown in FIG. 1(a), a DC brushless motor 1 comprises a rotor 2 having field magnetic poles provided a permanent magnet and armatures 3, 4, 5 in three phases (U, V, W phases). When given alternating currents are supplied to the three-phase armatures 3, 4, 5, the rotor 2 is rotated by a revolving magnetic field which is produced as a combination of the magnetic fields generated by the armatures 3, 4, 5.

The revolving magnetic field needs to be generated in a direction depending on the angle θ of the rotor 2 (in FIG. 1(a), the angle of the rotor 2 as measured clockwise from the U-phase armature 3, hereinafter referred to as "rotor angle θ"). Therefore, it is required to detect the rotor angle θ for the control of the DC brushless motor.

DC brushless motors generally have a position detecting sensor such as a resolver or the like for detecting the rotor angle θ. However, a rotor angle detecting apparatus for a DC brushless motor according to the present invention is capable of detecting the rotor angle θ without a position detecting sensor and hence dispenses with the need for a position detecting sensor.

As shown in FIG. 1(a), with the salient-pole rotor 2 being used, the magnetic reluctance of a gap between the rotor 2 and the armatures 2, 3, 4 varies periodically as the rotor 2 rotates. When the rotor 2 makes one revolution, the magnetic reluctance varies in two cycles, i.e., when the rotor 2 makes one half of a revolution, the magnetic reluctance varies in one cycle. The magnetic reluctance is maximum when the rotor 2 is in a position 1 and minimum when the rotor 2 is in a position 2.

The magnetic circuit of the DC brushless motor shown in FIG. 1(a) is schematically shown in FIG. 1(b) of the accompanying drawings. If it is assumed in FIG. 1(b) that the magnetic reluctance varies in a unit cosine-wave pattern and the average value thereof in one periodic cycle is 0.5, then the magnetic reluctances Ru, Rv, Rw in the respective phases U, V, W are expressed by the following equations (1) through (3):

$$Ru = 1 - \cos 2\theta \tag{1}$$

$$Rv = 1 - \cos\left(2\theta + \frac{2}{3}\pi\right) \tag{2}$$

$$Rw = 1 - \cos\left(2\theta - \frac{2}{3}\pi\right) \tag{3}$$

At this time, the magnetic reluctance Rtu of the gap as seen from the U phase can be determined according to the following equation (4):

$$\begin{aligned}
Rgu &= Ru + \frac{Rv \cdot Rw}{Rv + Rw} \\
&= 1 + \cos 2\theta + \\
&= \frac{1 + \cos\left(2\theta - \frac{2}{3}\pi\right) + \cos\left(2\theta + \frac{2}{3}\pi\right) + \cos\left(2\theta - \frac{2}{3}\pi\right) \cdot \cos\left(2\theta + \frac{2}{3}\pi\right)}{2 + \cos\left(2\theta - \frac{2}{3}\pi\right) + \cos\left(2\theta + \frac{2}{3}\pi\right)} \\
&= 1 + \cos 2\theta + \frac{1 - \cos 2\theta + \frac{1}{2}\left(\cos 4\theta + \cos\frac{2}{3}\pi\right)}{2 - \cos 2\theta} \\
&= \frac{8 - \cos\frac{2}{3}\pi}{4 - 2\cos 2\theta}
\end{aligned} \tag{4}$$

Therefore, if it is assumed that the U-phase comprises a unit winding, then the self-inductance of the U phase can be determined according to the following equation (5):

$$Lu = \frac{1}{Rgu} = \frac{4 - 2\cos 2\theta}{8 - \cos\frac{2}{3}\pi} \quad (5)$$

The mutual inductance Muw between the U and W phases and the mutual inductance Muv between the U and V phases can be determined according to the following equations (6), (7), respectively, because of the arrangement of the magnetic circuit:

$$Muw = -\frac{Rw}{Rv + Rw}Lu = -\frac{2 + 2\cos\left(2\theta + \frac{2}{3}\pi\right)}{8 - \cos\frac{2}{3}\pi} \quad (6)$$

$$Muv = -\frac{Rv}{Rv + Rw}Lu = -\frac{2 + 2\cos\left(2\theta - \frac{2}{3}\pi\right)}{8 - \cos\frac{2}{3}\pi} \quad (7)$$

The self-inductances and the mutual inductances of the V and W phases can similarly be determined. If the DC component of the self-inductance of each phase is represented by $1$, a variation of the DC component $1$ by $\Delta 1$, and the DC component of the mutual inductance between each phase pair by m, then the voltage equation of the DC brushless motor with the salient-pole rotor is given as follows:

$$\begin{bmatrix} VU \\ VV \\ VW \end{bmatrix} = r\begin{bmatrix} Iu \\ Iv \\ Iw \end{bmatrix} + \frac{d}{dt}\begin{bmatrix} 1 - \Delta 1\cos 2\theta & m - \Delta 1\cos\left(2\theta - \frac{2}{3}\pi\right) & m - \Delta 1\cos\left(2\theta + \frac{2}{3}\pi\right) \\ m - \Delta 1\cos\left(2\theta - \frac{2}{3}\pi\right) & 1 - \Delta 1\cos\left(2\theta + \frac{2}{3}\pi\right) & m - \Delta 1\cos 2\theta \\ m - \Delta 1\cos\left(2\theta + \frac{2}{3}\pi\right) & m - \Delta 1\cos 2\theta & 1 - \Delta 1\cos\left(2\theta - \frac{2}{3}\pi\right) \end{bmatrix}\begin{bmatrix} Iu \\ Iv \\ Iw \end{bmatrix} + \omega_m Ke\begin{bmatrix} \sin\theta \\ \sin\left(\theta - \frac{2}{3}\pi\right) \\ \sin\left(\theta - \frac{4}{3}\pi\right) \end{bmatrix} \quad (8)$$

where VU, VV, VW represent respective voltages applied to the U-, V-, W-phase armatures, Iu, Iv, Iw represent respective currents flowing through the U-, V-, W-phase armatures, r represents the electric resistance of each of the U-, V-, W-phase armatures, $\omega_m$ represents the electric angular velocity of the rotor 2, and Ke represents an induced voltage constant.

If the electric angular velocity $\omega_m$ is substantially 0, any effect of changes in the induced voltage and the angular velocity of the rotor 2 are small, and the voltage drop due to the resistance r is negligibly small in level, then the above equation (8) can be regarded and handled as the following equation (9):

$$\begin{bmatrix} VU \\ VV \\ VW \end{bmatrix} \approx \begin{bmatrix} 1 - \Delta 1\cos 2\theta & m - \Delta 1\cos\left(2\theta - \frac{2}{3}\pi\right) & m - \Delta 1\cos\left(2\theta + \frac{2}{3}\pi\right) \\ m - \Delta 1\cos\left(2\theta - \frac{2}{3}\pi\right) & 1 - \Delta 1\cos\left(2\theta + \frac{2}{3}\pi\right) & m - \Delta 1\cos 2\theta \\ m - \Delta 1\cos\left(2\theta + \frac{2}{3}\pi\right) & m - \Delta 1\cos 2\theta & 1 - \Delta 1\cos\left(2\theta - \frac{2}{3}\pi\right) \end{bmatrix}\frac{d}{dt}\begin{bmatrix} Iu \\ Iv \\ Iw \end{bmatrix} \quad (9)$$

In view of the fact that the sum of the currents flowing in the respective phases is zero, the equation (9) can be modified in terms of Iu, Iv, Iw as indicated by the following equation (10):

$$\frac{d}{dt}\begin{bmatrix} Iu \\ Iv \\ Iw \end{bmatrix} = K\begin{bmatrix} 1 - m + \Delta 1\cos 2\theta & \Delta 1\cos\left(2\theta - \frac{2}{3}\pi\right) & \Delta 1\cos\left(2\theta + \frac{2}{3}\pi\right) \\ \Delta 1\cos\left(2\theta - \frac{2}{3}\pi\right) & 1 - m + \Delta 1\cos\left(2\theta + \frac{2}{3}\pi\right) & \Delta 1\cos 2\theta \\ \Delta 1\cos\left(2\theta + \frac{2}{3}\pi\right) & \Delta 1\cos 2\theta & 1 - m + \Delta 1\cos\left(2\theta - \frac{2}{3}\pi\right) \end{bmatrix}\begin{bmatrix} VU \\ VV \\ VW \end{bmatrix} \quad (10)$$

where the calculating gain K is represented by the following equation (11):

$$K = \frac{1}{2(1-m)\cdot 1 - \Delta 1^2\left(\frac{3}{2} + 3\cos\frac{2}{3}\pi\right)} \quad (11)$$

When a high-frequency voltage imposer 21 (see FIG. 2 of the accompanying drawings) imposes high-frequency voltages vv, vu, vw, expressed by the following equation (12), on respective control voltage command values VU_c, VV_c, VW_c applied to the U-, V-, W-phase armatures, the current Iu flowing through the U-phase armature varies by a quantity represented by the following equation (13):

$$\begin{bmatrix} vu \\ vv \\ vw \end{bmatrix} = \omega \begin{bmatrix} \sin\omega t \\ \sin\left(\omega t - \frac{2}{3}\pi\right) \\ \sin\left(\omega t - \frac{4}{3}\pi\right) \end{bmatrix} \quad (12)$$

$$\frac{d}{dt}Iu = \omega K[(1-m)\sin\omega t + \Delta 1\{\cos 2\theta \sin\omega t + \cos\left(2\theta - \frac{2}{3}\pi\right)\sin\left(\omega t - \frac{2}{3}\pi\right) + \cos\left(2\theta + \frac{2}{3}\pi\right)\sin\left(\omega t + \frac{2}{3}\pi\right)\}] \quad (13)$$

$$= \omega K\left[(1-m)\sin\omega t - \frac{3\Delta 1}{2}\sin(2\theta - \omega t)\right]$$

where ω represents the electric angular velocity of the high-frequency voltages vv, vu, vw.

The current Iw flowing through the W-phase armature varies by a quantity represented by the following equation (14):

$$\frac{d}{dt}Iw = \omega K\left[(1-m)\sin\left(\omega t + \frac{2}{3}\pi\right)\Delta 1\{\cos\left(2\theta + \frac{2}{3}\pi\right)\sin\omega t + \cos 2\theta \sin\left(\omega t - \frac{2}{3}\pi\right) + \cos\left(2\theta - \frac{2}{3}\pi\right)\sin\left(\omega t + \frac{2}{3}\pi\right)\}\right] \quad (14)$$

$$= \omega K\left[(1-m)\sin\left(\omega t + \frac{2}{3}\pi\right) - \frac{3\Delta 1}{2}\sin\left(2\theta - \omega t + \frac{2}{3}\pi\right)\right]$$

By integrating the equations (13), (14) with respect to time t, the currents Iu, Iw can be determined by the following equations (15), (16):

$$Iu = K\left[-(1-m)\cos\omega t - \frac{3\Delta 1}{2}\cos(2\theta - \omega t)\right] \quad (15)$$

$$Iw = K\left[-(1-m)\cos\left(\omega t + \frac{2}{3}\pi\right) - \frac{3\Delta 1}{2}\cos\left(2\theta - \omega t + \frac{2}{3}\pi\right)\right] \quad (16)$$

The equations (15), (16) show that the currents Iu, Iw vary depending on the angular velocity ω of the added high-frequency voltages vu, vv, vw and the rotor angle θ. Therefore, it is proposed to detect the rotor angle θ by detecting the currents Iu, Iw which flow when the high-frequency voltages vu, vv, vw with the known angular velocity ω are added.

The present invention will be described below on the basis of the principles described above. According to the present invention, there is provided a rotor angle apparatus for a DC brushless motor, comprising voltage applying means for applying drive voltages to three-phase armatures of a salient-pole DC brushless motor, high-frequency voltage imposing means for imposing high-frequency voltages to the drive voltages, respectively, first current detecting means for detecting a current flowing through a first-phase armature among the three-phase armatures, second current detecting means for detecting a current flowing through a second-phase armature among the three-phase armatures, reference value extracting means for extracting a sine reference value depending on a sine value which is twice the rotor angle of the DC brushless motor and a cosine reference value depending on a cosine value which is twice the rotor angle of the DC brushless motor, using a first current value detected by the first current detecting means and a second current value detected by the second current detecting means when the high-frequency voltages are imposed on the drive voltages by the high-frequency voltage imposing means, and high-frequency components depending on the high-frequency voltages, and rotor angle calculating means for calculating the rotor angle of the DC brushless motor from the sine reference value and the cosine reference value.

While the high-frequency voltage imposing means imposes the high-frequency voltages on the drive voltages applied to the armatures of the DC brushless motor and the first current detecting means and the second current detecting means detect the first current value and the second current value, respectively, the reference value extracting means can extract the sine reference value and the cosine reference value according to the equations (15), (16). The rotor angle calculating means can directly calculate the rotor angle of the DC brushless motor from the sine reference value and the cosine reference value which are extracted by the reference value extracting means. The rotor angle detecting apparatus according to the present invention has a better initial follow-up capability than conventional apparatus, and can detect the rotor angle accurately without being affected by the motor parameters.

The reference value extracting means effects an integrating process or a low-pass filtering process on the high-frequency components to extract the sine reference value and the cosine reference value.

By effecting the integrating process or the low-pass filtering process, the reference value extracting means can fix the high-frequency components which tend to vary with time and extract the sine reference value and the cosine reference value.

The rotor angle calculating means calculates phase difference data representing a phase difference $(\theta - \hat{\theta})$ between an estimated value $(\hat{\theta})$ and an actual value $(\theta)$ of the rotor angle of the DC brushless motor, using the sine reference value and the cosine reference value, and calculates the rotor angle according to follow-up calculations using an observer which is constructed to eliminate the phase difference $(\theta - \hat{\theta})$ represented by the phase difference data.

The rotor angle calculating means can calculate the rotor angle from the sine reference value and the cosine reference value by using the observer.

Using Iu, Iw determined by the above equations (15), (16), the relationship of the following equation (17) is obtained:

$$\cos\left(\omega t + \frac{2}{3}\pi\right) \cdot Iu - \cos\omega t \cdot Iw = K\left[-(1-m)\cos\left(\omega t + \frac{2}{3}\pi\right)\cos\omega t - \frac{3\Delta 1}{2}\cos\left(\omega t + \frac{2}{3}\pi\right)\cos(2\theta - \omega t) + \right. \quad (17)$$

$$\left. (1-m)\cos\omega t\cos\left(\omega t + \frac{2}{3}\pi\right) + \frac{3\Delta 1}{2}\cos\omega t\cos\left(2\theta - \omega t + \frac{2}{3}\pi\right)\right]$$

$$= K\frac{3\Delta 1}{2}\left[-\cos\left(2\omega t - 2\theta - \frac{2}{3}\pi\right) + \cos\left(2\omega t - 2\theta - \frac{2}{3}\pi\right)\right]$$

$$= -K\frac{3\sqrt{3}\,\Delta 1}{2}[\sin(2\omega t - 2\theta)]$$

Since the currents flowing through the U- and W-phase armatures generally contain a DC component, the current Iu flowing through the U-phase armature and the current Iw flowing through the W-phase armature are rewritten as the following equations (18), (19):

$$Iu = K\left[-(1-m)\cos\omega t - \frac{3\Delta 1}{2}\cos(2\theta - \omega t)\right] + Iudc \quad (18)$$

where Iudc: the DC component of the current flowing through the U-phase armature.

$$Iw = K\left[-(1-m)\cos\left(\omega t + \frac{2}{3}\pi\right) - \frac{3\Delta 1}{2}\cos\left(2\theta - \omega t + \frac{2}{3}\pi\right)\right] + Iwdc \quad (19)$$

where Iwdc: the DC component of the current flowing through the W-phase armature.

From the relationship of the equation (17) and the following equation (20), a sine reference value Vs and a cosine reference value Vc which are twice (2θ) the rotor angle θ can be calculated respectively by the following equations (21), (22), the currents Iu, Iw containing the DC components according to the equations (18), (19) and high-frequency components depending on the imposed high-frequency voltages:

$$\sin(2\omega t - 2\theta) = \sin 2\omega t \cos 2\theta - \cos 2\omega t \sin 2\theta \quad (20)$$

$$Vs = \int_0^{\frac{2\pi}{\omega}}\left(\cos 2\omega t\cos\left(\omega t + \frac{2}{3}\pi\right) \cdot Iu - \cos 2\omega t\cos\omega t \cdot Iw\right)dt \quad (21)$$

$$= -K\frac{3\sqrt{3}\,\Delta 1}{2}\int_0^{\frac{2\pi}{\omega}}\cos 2\omega t \sin(2\omega t - 2\theta)dt +$$

$$\int_0^{\frac{2\pi}{\omega}}\left(\cos 2\omega t \cdot \cos\left(\omega t + \frac{2}{3}\pi\right) \cdot Iudc - \cos 2\omega t \cdot \cos\omega t \cdot Iwdc\right)dt$$

$$= -K\frac{3\sqrt{3}\,\Delta 1}{2}\int_0^{\frac{2\pi}{\omega}}\left(\frac{\sin 4\omega t}{2}\cos 2\theta - \frac{1 + \cos 4\omega t}{2}\sin 2\theta\right)dt +$$

$$\int_0^{\frac{2\pi}{\omega}}\left(\frac{\cos\left(3\omega t + \frac{2}{3}\pi\right) + \cos\left(\omega t - \frac{2}{3}\pi\right)}{2}Iudc - \frac{\cos 3\omega t + \cos\omega t}{2}Iwdc\right)dt$$

$$= \frac{2\pi}{\omega}K\frac{3\sqrt{3}\,\Delta 1}{4}\sin 2\theta$$

-continued $$Vc = \int_0^{\frac{2\pi}{\omega}}\left(\sin 2\omega t\cos\left(\omega t + \frac{2}{3}\pi\right) \cdot Iu - \sin 2\omega t\cos\omega t \cdot Iw\right)dt \quad (22)$$

$$= K\frac{3\sqrt{3}\,\Delta 1}{2}\int_0^{\frac{2\pi}{\omega}}\sin 2\omega t \sin(2\omega t - 2\theta)dt +$$

$$\int_0^{\frac{2\pi}{\omega}}\left(\sin 2\omega t \cdot \cos\left(\omega t + \frac{2}{3}\pi\right) \cdot Iudc - \sin 2\omega t \cdot \cos\omega t \cdot Iwdc\right)dt$$

$$= K\frac{3\sqrt{3}\,\Delta 1}{2}\int_0^{\frac{2\pi}{\omega}}\left(\frac{1 - \cos 4\omega t}{2}\cos 2\theta - \frac{\sin 4\omega t}{2}\sin 2\theta\right)dt +$$

$$\int_0^{\frac{2\pi}{\omega}}\left(\frac{\sin\left(3\omega t + \frac{2}{3}\pi\right) + \sin\left(\omega t - \frac{2}{3}\pi\right)}{2}Iudc - \frac{\sin 3\omega t + \sin\omega t}{2}Iwdc\right)dt$$

$$= \frac{2\pi}{\omega}K\frac{3\sqrt{3}\,\Delta 1}{4}\cos 2\theta$$

Therefore, the reference value extracting means can calculate the sine reference value and the cosine reference value by calculating the equations (21), (22) as the integrating process.

The rotor angle of the DC brushless motor can be calculated according to the following equation (23) from the sine reference value (Vs) calculated according to the equation (21) and the cosine reference value (Vc) calculated according to the equation (22):

$$\theta = \frac{1}{2}\tan^{-1}\frac{Vs}{Vc} \quad (23)$$

The $\tan^{-1}$ function varies greatly as the sine reference value (Vs) and the cosine reference value (Vc) vary. Therefore, when the rotor angle of the DC brushless motor is calculated according to the equation (23), a detecting error of the rotor angle may increase due to a calculating error of the sine reference value (Vs) and the cosine reference value (Vc).

In view of the foregoing shortcoming, the rotor angle calculating means generates phase difference data representing a phase difference $(\theta - \hat{\theta})$ between an estimated value $(\hat{\theta})$ and an actual value $(\theta)$ of the rotor angle of the DC brushless motor according to the following equation (24) while the high-frequency voltages are imposed on the drive voltages by the high-frequency voltage imposing means and the sine reference value and the cosine reference value are extracted by the reference value extracting means in each control cycle, calculates the rotor angle of the DC brushless motor according to the above equation (23) in a first control cycle, and, in next and following control cycles, uses the rotor angle of the DC brushless motor calculated in a preceding control cycle as an estimated value ($\hat{\theta}$) for the rotor angle of the DC brushless motor in the preceding control cycle, updates the estimated value ($\hat{\theta}$) for the rotor angle of the DC brushless motor with an observer which sequentially updates and calculates the estimated value ($\hat{\theta}$) for the rotor angle of the DC brushless motor based on the phase difference data to eliminate the phase difference ($\theta - \hat{\theta}$) depending on the phase difference data calculated in the preceding control cycle, thereby to calculate an estimated value ($\hat{\theta}$) for the rotor angle of the DC brushless motor in a present control cycle, and uses the estimated value ($\hat{\theta}$) for the rotor angle as the rotor angle of the DC brushless motor.

$$Vs \cdot \cos 2\hat{\theta} - Vc \cdot \sin 2\hat{\theta} = \sqrt{Vs^2 - Vc^2} \sin(2\theta - 2\hat{\theta}) \quad (24)$$
$$\approx \sqrt{Vs^2 - Vc^2} \cdot 2(\theta - \hat{\theta})$$
$$(\text{in case } \theta - \hat{\theta} \approx 0)$$

With the above arrangement, the rotor angle calculating means calculates the rotor angle of the DC brushless motor according to the equation (23) only in the first control cycle. In next and following control cycles, the rotor angle calculating means applies the phase difference data generated based on the equation (24) in the preceding control cycle and the rotor angle of the DC brushless motor calculated in the preceding control cycle to the observer, and calculates an estimated value ($\hat{\theta}$) for the rotor angle of the DC brushless motor in the preceding control cycle. The rotor angle calculating means can thus detect accurately the rotor angle of the DC brushless motor in the next and following control cycles.

The rotor angle calculating means uses, as the phase difference data, $\Delta\theta_1$ produced by dividing the phase difference by $\sqrt{Vs^2+Vc^2}$ according to the following equation (25) thereby to prevent the gain of the observer from varying depending on changes in the magnitudes of the sine reference value Vs and the cosine reference value Vc. Therefore, the rotor angle of the DC brushless motor can stably be detected.

$$\Delta\theta_1 = 2(\theta - \hat{\theta}) \approx \sin(2\theta - 2\hat{\theta}) \quad (25)$$
$$= \frac{Vs \cdot \cos 2\hat{\theta} - Vc \cdot \sin 2\hat{\theta}}{\sqrt{Vs^2 + Vc^2}}$$

where $\Delta\theta_1$: the phase difference data.

If the rotor angle calculating means has a relatively low calculating capability, the phase difference data $\Delta\theta_1$ may be calculated by approximating calculations according to the following equation (26) instead of the equation (25):

$$\Delta\theta_1 = 2(\theta - \hat{\theta}) \approx \sin(2\theta - 2\hat{\theta}) \quad (26)$$

$$\approx \begin{cases} \frac{Vs \cdot \cos 2\hat{\theta} - Vc \cdot \sin 2\hat{\theta}}{|Vs|} & (|Vs| > |Vc|) \\ \frac{Vs \cdot \cos 2\hat{\theta} - Vc \cdot \sin 2\hat{\theta}}{|Vc|} & (|Vc| > |Vs|) \end{cases}$$

When the rotor angle of the DC brushless motor is detected according to the observer using the phase difference data $\Delta\theta_1$ calculated according to the equation (25) and the phases of the currents supplied to the armatures of the DC brushless motor based on the detected rotor angle, a bottom value of the output torque of the DC brushless motor in a high current range, i.e., a lower end value of the varying range of the output torque, may be lowered, tending to increase the pulsation of the output torque. The inventors of the present invention have made various studies in order to suppress such a reduction in the bottom value of the output torque, and have found as a result that the bottom value of the output torque can be increased by forcibly shifting the rotor angle of the DC brushless motor calculated by the rotor angle calculating means to change the phase difference between the detected and actual values of the rotor angle.

The rotor angle calculating means can construct the observer using $\Delta\theta_2$ calculated according to the following equation (27) with an offset value (offset) added thereto as the phase difference data, for thereby calculating the rotor angle of the DC brushless motor to equalize the difference between the detected and actual values of the rotor angle to the offset value. Thus, the phase difference between the detected and actual values of the rotor angle is forcibly shifted to suppress a reduction in the bottom value of the output torque for thereby reducing the pulsation of the output torque:

$$\Delta\theta_2 = 2(\theta - \hat{\theta}) + \text{offset} \approx \sin(2\theta - 2\hat{\theta}) + \text{offset} \quad (27)$$
$$= \frac{Vs \cdot \cos 2\hat{\theta} - Vc \cdot \sin 2\hat{\theta}}{\sqrt{Vs^2 + Vc^2}} + \text{offset}$$

where $\Delta\theta_2$: the phase difference data.

The inductance of the rotor of the DC brushless motor varies in periodic cycles each having an electric angle of 180°. If the rotor angle of the DC brushless motor is detected by imposing the high-frequency voltages to the drive voltages of the DC brushless motor with the high-frequency voltage imposing means, then the direction of the magnetic poles of the rotor magnet of the DC brushless motor cannot be determined. That is, the rotor angle $\theta$ ($0 \leq \theta \leq 180°$) and the rotor angle $\theta+180°$ cannot be detected separately from each other.

To overcome the above shortcoming, the inventors have made various studies and found that if the DC brushless motor is controlled according to a dq conversion process which handles the DC brushless motor as an equivalent circuit having a q-axis armature disposed on a q-axis extending in the direction of magnetic fluxes of field magnetic poles of the rotor of the DC brushless motor and a d-axis armature disposed on a d-axis extending perpendicularly to the q-axis, then when a current is passed through the q-axis armature and the rotor angle of the rotor is detected by the rotor angle calculating means, the sine reference value and the cosine reference value depending on the calculated rotor angle differ when the direction of the magnetic field generated by q-axis armature and the direction of the magnetic field generated by the magnetic poles of the rotor are the same as each other and when these directions are different from each other.

According to the present invention, the rotor angle detecting apparatus further includes correlation data storage means for handling the DC brushless motor as an equivalent circuit having a q-axis armature disposed on a q-axis extending in the direction of magnetic fluxes of field magnetic poles of the rotor of the DC brushless motor and a d-axis armature disposed on a d-axis extending perpendicularly to the q-axis, and storing, in advance, data of a map or a relational equation representing a correlation between a rotor angle of the DC brushless motor which is calculated by the rotor angle calculating means while a predetermined magnetic pole determining current is passed through the q-axis armature, and a threshold established between a saturated reference value which is calculated by a predetermined calculating process depending on the sine reference value and the cosine reference value which are extracted by the reference value extracting means when the rotor is in a saturated state in which the direction of a magnetic field generated by the q-axis armature and the direction of a magnetic field generated by magnetic poles of the rotor are the same as each other when the rotor angle is calculated, and an unsaturated reference value which is calculated by the predetermined calculating process depending on the sine reference value and the cosine reference value which are extracted by the reference value extracting means when the rotor is in an unsaturated state in which the direction of the magnetic field generated by the q-axis armature and the direction of the magnetic field generated by the magnetic poles of the rotor are opposite to each other when the rotor angle is calculated.

The rotor angle detecting apparatus also has magnetic pole direction determining means for handling the DC brushless motor as the equivalent circuit, and comparing a threshold value depending on the rotor angle which is obtained when the rotor angle calculated by the rotor angle calculating means while the magnetic pole determining current is passed through the q-axis armature is applied to the map or the relational equation, with a magnetic pole determining value calculated according to the predetermined calculating process depending on the sine reference value and the cosine reference value which are extracted by the reference value extracting means when the rotor angle is calculated, thereby to determine whether the rotor is in the saturated state or the unsaturated state for determining the direction of the magnetic poles of the rotor.

With the above arrangement, as described in greater detail later on, the magnetic pole direction determining means detects the rotor angle of the DC brushless motor while the magnetic pole determining current is passed through the q-axis armature. The magnetic pole direction determining means then compares a threshold value obtained by applying the calculated rotor angle to the map/relational equation with a magnetic pole determining value calculated according to the predetermined calculating process depending on the sine reference value and the cosine reference value which are extracted by the reference value extracting means when the rotor angle is calculated, thereby to determine the direction of the magnetic poles of the rotor. In this manner, the rotor angle of the DC brushless motor can be detected in a range from 0 to 360°.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 4(*a*) and 4(*b*) are graphs illustrative of a process of suppressing a reduction in the bottom value of the output torque of the DC brushless motor.

DETAILED DESCRIPTION OF THE PREFERRED EMBODIMENT

Figure 1:
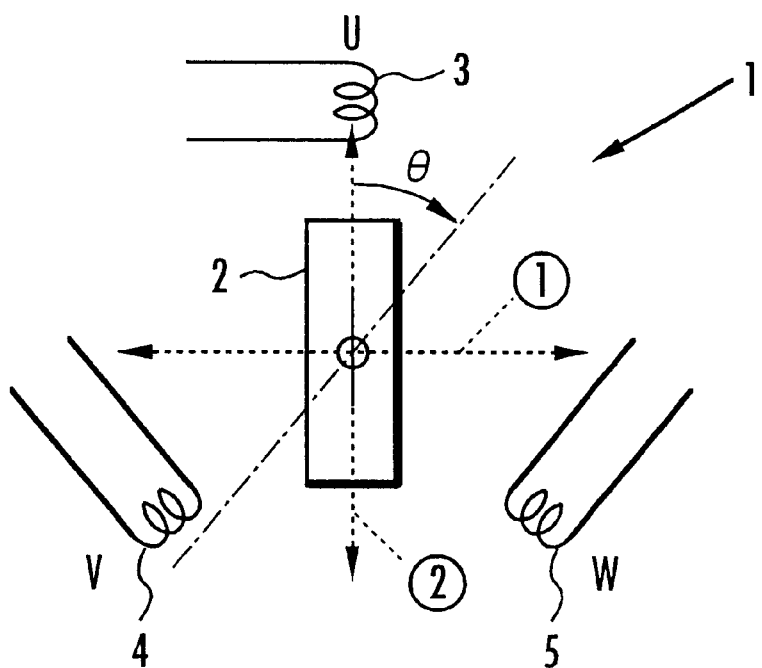
FIGS. 1(*a*) and 1(*b*) are views schematically showing a structure of a DC brushless motor.
Figure 1:
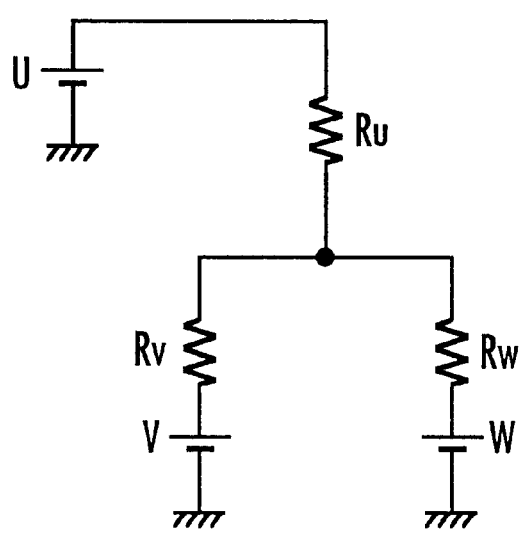

A rotor angle detecting apparatus according to the present invention will be described in detail below with reference to FIGS. 1(*a*), 1(*b*) through 4(*a*), 4(*b*).

Figure 2:
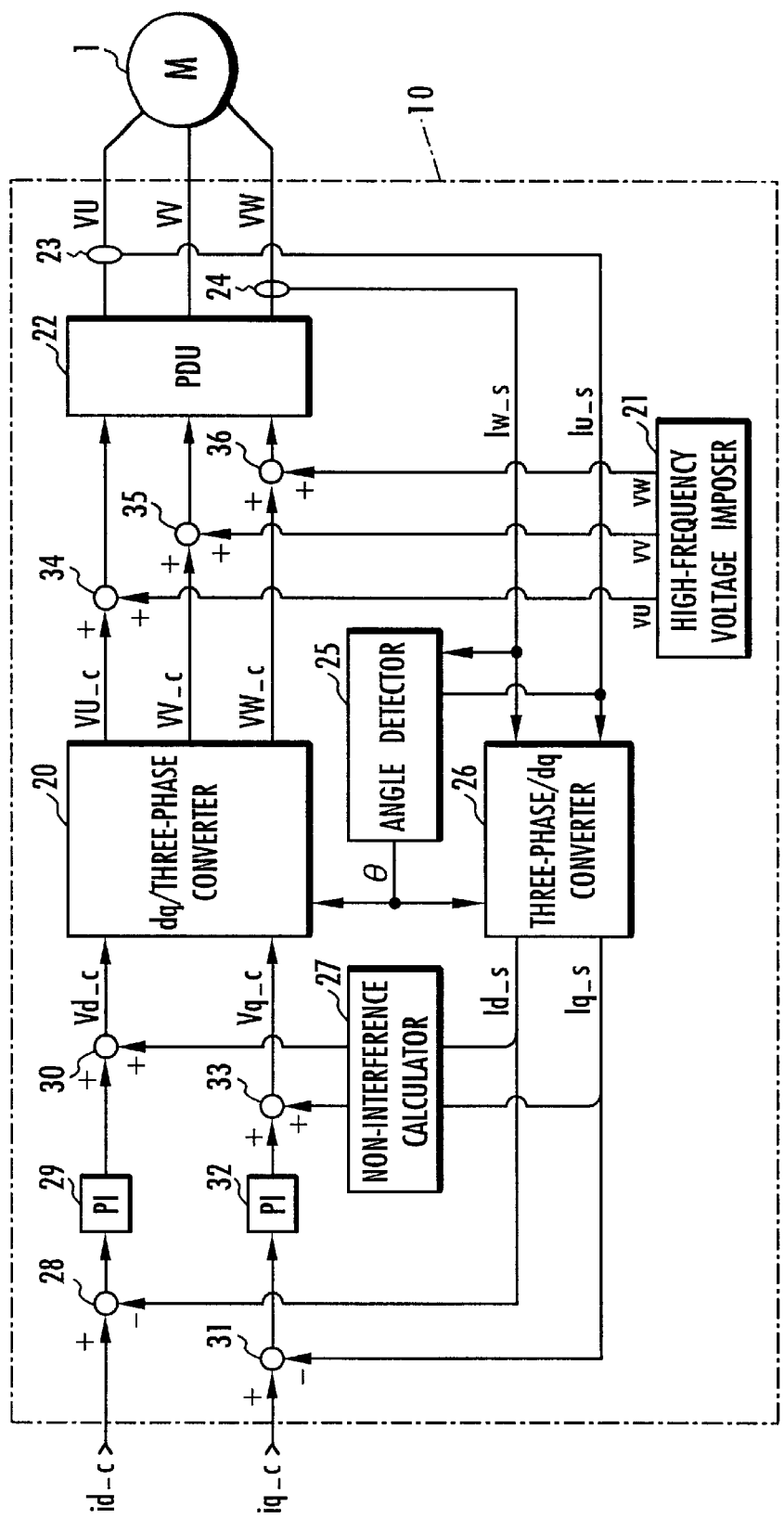
FIG. 2 is a block diagram of a motor controller for controlling operation of the DC brushless motor shown in FIGS. 1(*a*) and 1(*b*)

A motor controller 10 shown in FIG. 2 controls currents flowing through the armatures 3, 4, 5 of the salient-pole DC brushless motor 1 (hereinafter referred to as "motor 1") shown in FIGS. 1(*a*) and 1(*b*) through a feedback loop. The motor controller 10 handles the motor 1 as an equivalent circuit according to a dq coordinate system which has a q-axis armature disposed on a q-axis extending in the direction of magnetic fluxes of field magnetic poles of the rotor 2 and a d-axis armature disposed on a d-axis extending perpendicularly to the q-axis.

The motor controller 10 controls the voltages applied to the three-phase armatures of the motor 1 to bring a command value Id_c for the current flowing through the d-axis armature (hereinafter referred to as "d-axis current") and a command value Iq_c for the current flowing through the q-axis armature (hereinafter referred to as "q-axis current"), which command values are given from an external source, into conformity with a detected value Id_s of the d-axis current and a detected value Iq_s of the q-axis current, respectively, which have been calculated by way of three-phase/dq conversion from detected values of the currents that actually flow through the three-phase armatures of the motor 1.

The motor controller 10 comprises a dq/three-phase converter 20 for converting a command value Vd_c for the voltage applied to the d-axis armature (hereinafter referred to as "d-axis voltage") and a command value Vq_c for the voltage applied to the q-axis armature (hereinafter referred to as "q-axis voltage") into command values VU_c, VV_c, VW_c for the voltages applied to the U-, V-, W-phase armatures of the motor 1, a high-frequency voltage imposer 21 (corresponding to a high-frequency voltage imposing means according to the present invention) for imposing high-frequency voltages vu, vv, vw respectively on the command values VU_c, VV_c, VW_c outputted from the dq/three-phase converter 20, and a power drive unit (PDU) 22 (corresponding to a voltage applying means according to the present invention) for applying voltages VU, VV, VW depending on the command values VU_c, VV_c, VW_c on which the high-frequency voltages vu, vv, vw have been imposed, to the U-, V-, W-phase armatures of the motor 1.

The motor controller 10 also has a U-phase current sensor 23 (corresponding to a first current detecting means according to the present invention) for detecting a current flowing through the armature of the U phase (corresponding to a first phase) of the motor 1, a W-phase current sensor 24 (corresponding to a second current detecting means according to the present invention) for detecting a current flowing through the armature of the W phase (corresponding to a second phase) of the motor 1, an angle detector 25 for detecting the rotor angle θ using a detected current value IU_s from the U-phase current sensor 23 and a detected current value IW_s from the W-phase current sensor 24, a three-phase/dq converter 26 for calculating the detected values Id_s, Iq_s using the detected current values IU_s, IW_s, and a non-interference calculator 27 for canceling out the effect of speed electromotive forces that interfere with each other between the d-axis and the q-axis.

In the motor controller 10, a first subtractor 28 subtracts the detected value Id_s from the command value Id_c for the d-axis current, and a first PI processor 29 performs a PI (Proportional plus Integral) process on the difference between the detected value Id_s and the command value Id_c. A first adder 30 adds a non-interference component to an output signal from the first PI processor 29, generating the command value Vd_c for the d-axis voltage depending on the difference between the detected value Id_s and the command value Id_c.

Similarly, a second subtractor 31 subtracts the detected value Iq s from the command value Iq_c for the q-axis current, and a second PI processor 32 performs a PI process on the difference between the detected value Iq_s and the command value Iq_c. A second adder 33 adds a non-interference component to an output signal from the second PI processor 32, generating the command value Vq_c for the q-axis voltage depending on the difference between the detected value Iq s and the command value Iq_c.

The command value Vd_c for the d-axis voltage and the command value Vq_c for the q-axis voltage are supplied to the dq/three-phase converter 20. Based on the command values VU_c, VV_c, VW_c with the high-frequency voltages vu, vv, vw imposed thereon, supplied from the dq/three-phase converter 20, the power drive unit 22 applies the three-phase voltages VU, VV, VW to the armatures of the motor 1 to control the currents flowing through the armatures in order to eliminate the difference between the detected value Id_s and the command value Id_c and the difference between the detected value Iq_s and the command value Iq_c.

In order for the three-phase/dq converter 26 to calculate the detected value Id_s of the d-axis current and the detected value Iq_s of the q-axis current from the detected current value IU_s from the U-phase current sensor 23, the detected current value IW_s from the W-phase current sensor 24, and the rotor angle θ according to the following equations (28), (29), the motor controller 10 is required to detect the rotor angle θ:

$$id = \sqrt{2}\left\{Iu \cdot \sin\left(\theta + \frac{2}{3}\pi\right) - Iw \cdot \sin\theta\right\} \quad (28)$$

$$iq = \sqrt{2}\left\{Iu \cdot \cos\left(\theta + \frac{2}{3}\pi\right) - Iw \cdot \cos\theta\right\} \quad (29)$$

The motor controller 10 detects the rotor angle θ by imposing the high-frequency voltages vu, vv, vw (see the equation (12)) from the high-frequency voltage imposer 21 respectively on the command values VU_c, VV_c, VW_c for the voltages applied to the U-, V-, W-phases which are out-putted from the dq/three-phase converter 20, without using a position detecting sensor such as a resolver or the like.

Specifically, a third adder 34 adds the high-frequency voltage vu to the command value VU_c, a fourth adder 35 adds the high-frequency voltage vv to the command value VV_c, and a fifth adder 36 adds the high-frequency voltage vw to the command value VW_c. The angle detector 25 detects the rotor angle θ from the detected current value IU_s from the U-phase current sensor 23 and the detected current value IW_s from the W-phase current sensor 24 at the time the high-frequency voltages vu, vv, vw are imposed on the command values VU_c, VV_c, VW_c.

The angle detector 25 has the functions of a reference value extracting means, a rotor angle calculating means, and a magnetic pole direction determining means according to the present invention. The angle detector 25, the power drive unit 22, the high-frequency voltage imposer 21, the U-phase current sensor 23, and the W-phase current sensor 24 jointly make up the apparatus for detecting the rotor angle of a DC brushless motor according to the present invention. A process of detecting the rotor angle θ with the high-frequency voltage imposer 21 and the angle detector 25 will be described below.

The angle detector 25 puts the detected current value IU_s from the U-phase current sensor 23 and the detected current value IW_s from the W-phase current sensor 24 respectively in Iu, Iw in the above equations (21), (22), and puts the angular velocity X of the high-frequency voltages vu, vv, vw imposed by the high-frequency voltage imposer 21 in ω in the equations (21), (22), thereby calculating a sine reference value Vs and a cosine reference value Vc which are twice the rotor angle θ. The sine and cosine components of ω in the equations (21), (22) correspond to high-frequency components of the imposed high-frequency voltages according to the present invention.

In the equations (21), (22), the integrating period ranges from 0 to 2π/ω to equalize integrated values with respect to DC components (Iudc, Iwdc) of Iu, Iw to 0. If Iu, Iw do not contain DC components and are expressed by the above equations (15), (16), then a sine reference value Vs and a cosine reference value Vc can be calculated with the integrating period ranging from 0 to π/ω as indicated by the following equations (30), (31):

$$Vs = \int_0^{\frac{\pi}{\omega}} \left\{ \cos2\omega t \cos\left(\omega t + \frac{2}{3}\pi\right) \cdot Iu - \cos2\omega t \cos\omega t \cdot Iw \right\} dt \quad (30)$$

$$= -K\frac{3\sqrt{3}\,\Delta 1}{2} \int_0^{\frac{\pi}{\omega}} \cos2\omega t \sin(2\omega t - 2\theta) dt$$

$$= -K\frac{3\sqrt{3}\,\Delta 1}{2} \int_0^{\frac{\pi}{\omega}} \cos2\omega t (\sin2\omega t \cos2\theta - \cos2\omega t \sin2\theta) dt$$

$$= -K\frac{3\sqrt{3}\,\Delta 1}{2} \int_0^{\frac{\pi}{\omega}} \left(\frac{\sin4\omega t}{2}\cos2\theta - \frac{1+\cos4\omega t}{2}\sin2\theta\right) dt$$

$$= K\frac{3\sqrt{3}\,\Delta 1}{4} \sin2\theta$$

$$Vc = -\int_0^{\frac{\pi}{\omega}} \left\{ \sin2\omega t \cos\left(\omega t + \frac{2}{3}\pi\right) \cdot Iu - \sin2\omega t \cos\omega t \cdot Iw \right\} dt \quad (31)$$

$$= K\frac{3\sqrt{3}\,\Delta 1}{2} \int_0^{\frac{\pi}{\omega}} \sin2\omega t \sin(2\omega t - 2\theta) dt$$

$$= K\frac{3\sqrt{3}\,\Delta 1}{2} \int_0^{\frac{\pi}{\omega}} \sin2\omega t (\sin2\omega t \cos2\theta - \cos2\omega t \sin2\theta) dt$$

$$= K\frac{3\sqrt{3}\,\Delta 1}{2} \int_0^{\frac{\pi}{\omega}} \left(\frac{1-\cos4\omega t}{2}\cos2\theta - \frac{\sin4\omega t}{2}\sin2\theta\right) dt$$

$$= K\frac{3\sqrt{3}\,\Delta 1}{4} \cos2\theta$$

The angle detector 25 then calculates the rotor N; angle $\theta$ from the calculated sine and cosine reference values Vs, Vc according to the following equation (32):

$$\theta = \frac{1}{2}\tan^{-1}\frac{Vs}{Vc} \quad (32)$$

Even when the motor parameters of the motor 1 vary, since the ratio of the sine reference value Vs and the cosine reference value Vc which are calculated by the equations (21), (22) remains unchanged, the variations in the motor parameters do not affect the calculation of the rotor angle $\theta$ according to the equation (32).

Because variations in the inductance of the gap of the rotor 2 have a period which is ½ of the rotor angle $\theta$, the rotor angle $\theta$ can be calculated in an electric angle range from 0 to 180° or from 180° to 360° for the salient-pole DC brushless motor. In order to detect the rotor angle $\theta$ in an electric angle range from 0 to 360°, therefore, it is necessary to perform a process of determining the direction of the magnetic poles of the rotor 2.

When a current is passed through the q-axis armature to produce a magnetic field in the direction of the q-axis, i.e., the direction of magnetic fluxes of the magnet of the rotor 2, $\Delta 1$ (a variation in the DC component 1 of the self-inductance of each the phases U, V, W) is increased at the time the rotor 2 is in a saturated state where the direction of the magnetic field generated by the currents and the direction of the magnetic field generated by the magnet are the same as each other. However, $\Delta 1$ is reduced at the time the rotor 2 is in an unsaturated state where the direction of the magnetic field generated by the currents and the direction of the magnetic field generated by the magnet are opposite to each other.

Therefore, a magnetic pole determining value A which is calculated from the sine reference value Vs and the cosine reference value Vc (calculated by the equations (21), (22)) which vary depending on the value of $\Delta 1$ according to the following equation (40) (corresponding to a calculating process according to the present invention) differs when the rotor 2 is in the saturated state and when the rotor 2 is in the unsaturated state:

$$A = \sqrt{Vs^2 + Vc^2} \quad (33)$$

Therefore, the angle detector 25 can detect whether the rotor 2 is in the saturated state or the unsaturated state to determine the direction of the magnetic poles of the rotor 2 by calculating the sine reference value Vs and the cosine reference value Vc according to the equations (21), (22) from the detected current values from the W-phase current sensor 24 and the U-phase current sensor 23 while the high-frequency voltages vu, vv, vw are imposed by the high-frequency voltage imposer 21 and a predetermined magnetic pole determining current is passed through the q-axis armature, and comparing the magnetic pole determining value A calculated from the sine reference value Vs and the cosine reference value Vc according to the equation (33) with a predetermined threshold.

Depending on the configurations of the rotor 2 and the armatures 3, 4, 5, however, the magnetic pole determining value A may differ when the rotor 2 is in the saturated state and when the rotor 2 is in the unsaturated state. In such a case, the direction of the magnetic poles of the rotor 2 cannot be determined simply by comparing the magnetic pole determining value A with the predetermined threshold.

FIG. 3(a) is a graph which shows how the magnetic pole determining value A varies with respect to the actual angle values of the rotor 2. The graph shown in FIG. 3(a) has a horizontal axis representing actual values of the rotor angle $\theta$ and a vertical axis representing the magnetic pole determining value A. In FIG. 3(a), a curve ① indicates the transition of the magnetic pole determining value A when the rotor 2 is in the saturated state, and a curve ② indicates the transition of the magnetic pole determining value A when the rotor 2 is in the unsaturated state. If a constant threshold B is used to determine the direction of the magnetic poles of the rotor 2 as shown in FIG. 3(a), then since there are certain angles where the rotor 2 is judged as being saturated on both the curves ①, ②, the direction of the magnetic poles of the rotor 2 cannot not be determined from the magnetic pole determining value A.

To avoid the above drawback, the angle detector 25 determines the direction of the magnetic poles of the rotor 2 as follows:

A review of FIG. 3(a) reveals that while the curves ①, ② vary in the same periodic cycles, they are slightly out of phase with each other. A comparison between the rotor angle detected by the angle detector 25 when the rotor 2 is in the saturated state and the rotor angle detected by the angle detector 25 when the rotor 2 is in the unsaturated state indicates that these detected rotor angles differ from the actual rotor angle in a different fashion.

FIG. 3(b) is a graph which shows how the magnetic pole determining value A varies with respect to the angle values detected by the angle detector 25. The graph shown in FIG. 3(b) has a horizontal axis representing detected values of the rotor angle $\theta$ and a vertical axis representing the magnetic pole determining value A. In FIG. 3(b), a curve ③ indicates the transition of the magnetic pole determining value A when the rotor 2 is in the saturated state, and a curve indicates the transition of the magnetic pole determining value A when the rotor 2 is in the unsaturated state.

Figure 3:
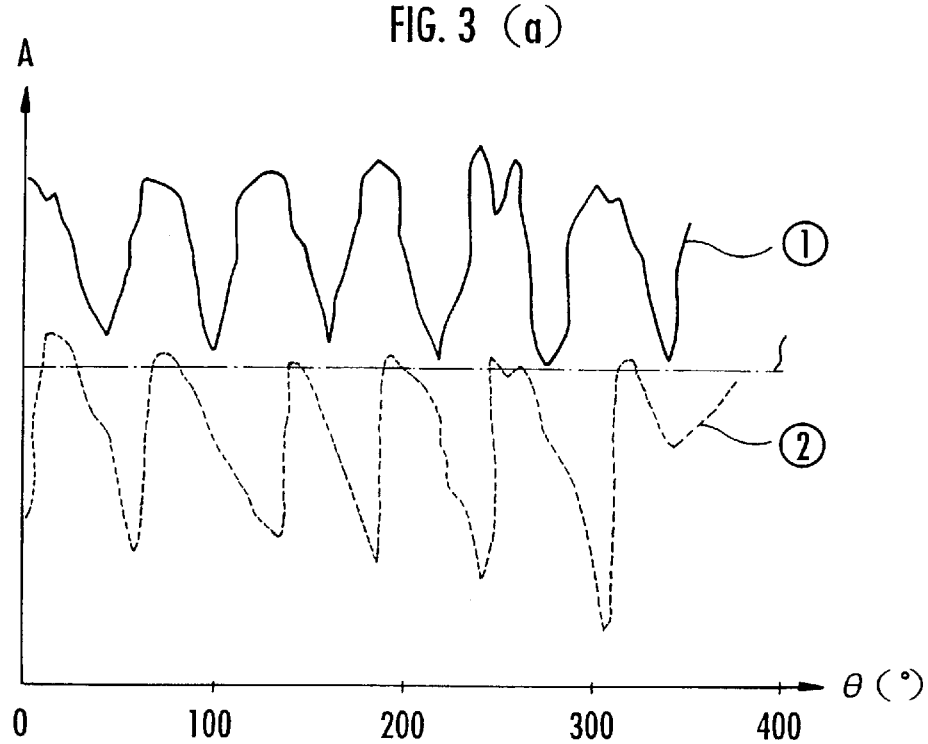
FIGS. 3(*a*) and 3(*b*) are graphs illustrative of a process of determining the direction of magnetic poles of the rotor of the DC brushless motor.
Figure 3:
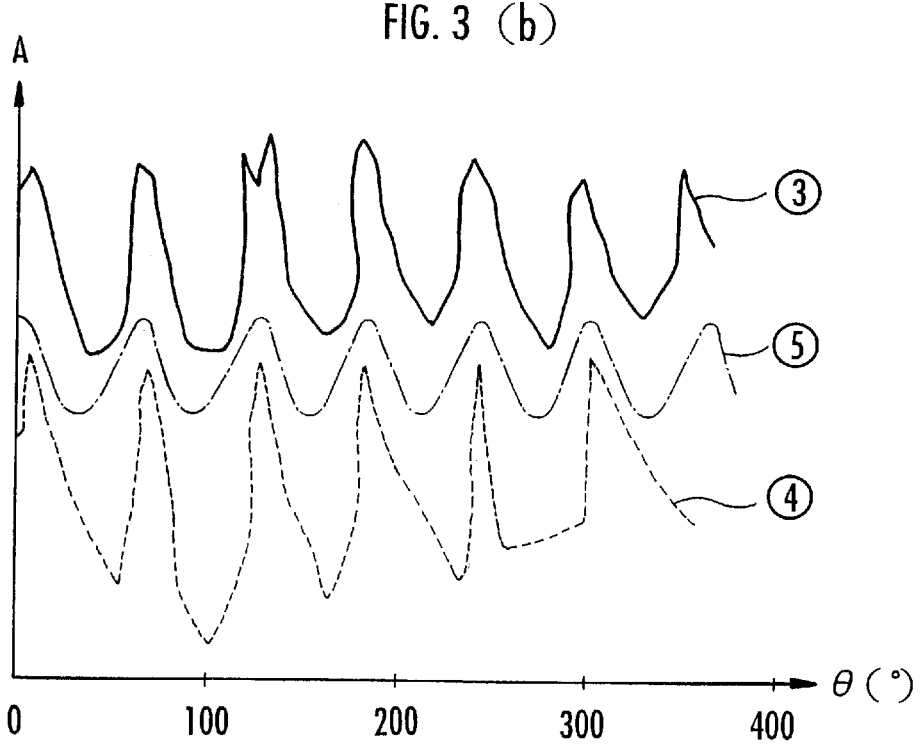

As can be seen from FIG. 3(*a*), the curves ③, ④ vary differently with respect to the detected values of the rotor angle θ. According to the present invention, a threshold whose value varies depending on the rotor angle θ as indicated by a curve ⑤ is established between the curves ③, ④. The angle detector 25 can now determine the direction of the magnetic poles of the rotor 2 by comparing the detected values of the rotor angle θ and the threshold represented by the curve ⑤.

In FIG. 3(*b*), the threshold varies in a sine-wave pattern which period is the same as the curves ③, ④. In order to obtain threshold values depending on the detected values of the rotor angle θ, a data map representing a correlation between rotor angles and threshold values corresponding to those rotor angles is stored in a memory.

The angle detector 25 detects a rotor angle θ while the high-frequency voltages vu, vv, vw are imposed on the drive voltages VU, VV, VW of the motor 1 and a predetermined magnetic pole determining current is passed through the q-axis armature, and applies the detected rotor angle θ to the correlation data of the data map, thereby obtaining a threshold value corresponding to the detected rotor angle θ.

Then, the angle detector 25 calculates a magnetic pole determining value A according to the equation (33) from the sine reference value Vs and the cosine reference value Vc calculated when the rotor angle θ is detected, and compares the magnetic pole determining value A with the threshold value corresponding to the detected rotor angle θ. If the magnetic pole determining value A is greater than the threshold value, then the rotor 2 is judged as being in the saturated state, and if the magnetic pole determining value A is smaller than the threshold value, then the rotor 2 is judged as being in the unsaturated state. As a result, the angle detector 25 can determine the direction of the magnetic poles of the rotor 2.

The correlation between rotor angles and threshold values corresponding to those rotor angles may be represented by an equation, rather than a data map, and the data of the equation may be stored in a memory. A rotor angle θ detected by the angle detector 25 may be applied to the equation, thereby obtaining a threshold value corresponding to the detected rotor angle θ.

In the present embodiment, the angle detector 25 calculates a sine reference value Vs and a cosine reference value Vc which are twice the rotor angle θ by integrating high-frequency components that vary with time according to the equations (21), (22). However, the angle detector 25 may effect low-pass filtering on high-frequency components to output a sine reference value and a cosine reference value.

In the case where an estimated angle $\hat{\theta}$ of the rotor angle θ is used, if the difference between the rotor angle θ and the estimated angle $\hat{\theta}$ is substantially zero, then these angles are related to each other according to the equation (34) given below. Using estimated angle $\hat{\theta}$, the sine reference value Vs, and the cosine reference value Vc, an approximate value of the phase difference between the estimated angle $\hat{\theta}$ and the actual angle θ can be determined, and the actual angle θ can be calculated from the approximate value of the phase difference.

$$Vs \cdot \cos 2\hat{\theta} - Vc \cdot \sin 2\hat{\theta} = K \frac{3\sqrt{3}}{4\omega} \Delta 1 \sin(2\theta - 2\hat{\theta}) \approx \tilde{K}(\theta - \hat{\theta}) \quad (34)$$

Using the approximate value of the phase difference, it is also possible to correct the estimated angle $\hat{\theta}$ of the rotor angle such that an estimated error of the estimated angle $\hat{\theta}$ will be converged to zero by follow-up calculations made by an observer. A process of correcting the estimated angle $\hat{\theta}$ with an observer will be described below.

If it is assumed that the DC brushless motor 1 is rotating at a constant angular velocity, then the relationship between the rotor angle θ and the angular velocity $\omega_m$ per sampling time Δt is expressed by the following equation (35):

$$\begin{bmatrix} \theta(n+1) \\ \omega_m(n+1) \end{bmatrix} = \begin{bmatrix} 1 & \Delta t \\ 0 & 1 \end{bmatrix} \begin{bmatrix} \theta(n) \\ \omega_m(n) \end{bmatrix} \quad (35)$$

where θ(n) and $\omega_m$(n) represent a rotor angle θ and a angular velocity $\omega_m$, respectively, at a certain sampling time n, and θ(n+1) and $\omega_m$(n+1) represent a rotor angle θ and a angular velocity $\omega_m$, respectively, at a sampling time n+1 following the sampling time n.

Then, the following equation (36) is calculated by inputting the estimated angle $\hat{\theta}$ and the estimated angular velocity $\omega_m$ to a simulator of the model represented by the equation (35), multiplying the phase difference between the actual angle θ(n) and the estimated angle $\hat{\theta}$(n) by a gain based on calculating gains K1, K2, $\tilde{K}$, and feeding back the result:

$$\begin{bmatrix} \hat{\theta}(n+1) \\ \hat{\omega}_m(n+1) \end{bmatrix} = \begin{bmatrix} 1 & \Delta t \\ 0 & 1 \end{bmatrix} \begin{bmatrix} \hat{\theta}(n) \\ \hat{\omega}_m(n) \end{bmatrix} + \begin{bmatrix} K1 \\ K2 \end{bmatrix} \tilde{K}(\theta(n) - \hat{\theta}(n)) \quad (36)$$

$$= \begin{bmatrix} 1 & \Delta t \\ 0 & 1 \end{bmatrix} \begin{bmatrix} \hat{\theta}(n) \\ \hat{\omega}_m(n) \end{bmatrix} + \begin{bmatrix} \tilde{K}1 \\ \tilde{K}2 \end{bmatrix} (\theta(n) - \hat{\theta}(n))$$

where $\tilde{K}1 = K1 \cdot \tilde{K}$, $\tilde{K}2 = K2 \cdot \tilde{K}$.

The above equation (36) represents an observer with respect to a steady-rotation motor model subjected to a feedback process based on the phase difference, on the assumption that the simulator motor rotates at a constant angular velocity. From the equations (35), (36), the following equation (37) is satisfied:

$$\begin{bmatrix} \theta(n+1) - \hat{\theta}(n+1) \\ \omega_m(n+1) - \hat{\omega}_m(n+1) \end{bmatrix} = \begin{bmatrix} 1 & \Delta t \\ 0 & 1 \end{bmatrix} \begin{bmatrix} \theta(n) \\ \omega_m(n) \end{bmatrix} - \begin{bmatrix} 1 & \Delta t \\ 0 & 1 \end{bmatrix} \begin{bmatrix} \hat{\theta}(n) \\ \hat{\omega}_m(n) \end{bmatrix} - \quad (37)$$

$$\begin{bmatrix} \tilde{K}1 \\ \tilde{K}2 \end{bmatrix} (\theta(n) - \hat{\theta}(n))$$

$$= \begin{bmatrix} 1 & \Delta t \\ 0 & 1 \end{bmatrix} \begin{bmatrix} \theta(n) - \hat{\theta}(n) \\ \omega_m(n) - \hat{\omega}_m(n) \end{bmatrix} - \begin{bmatrix} \tilde{K}1 \\ \tilde{K}2 \end{bmatrix}$$

$$[1 \quad 0] \begin{bmatrix} \theta(n) - \hat{\theta}(n) \\ \omega_m(n) - \hat{\omega}_m(n) \end{bmatrix}$$

-continued $$= \begin{bmatrix} 1-\tilde{K}1 & \Delta t \\ -K2 & 1 \end{bmatrix} \begin{bmatrix} \theta(n) - \hat{\theta}(n) \\ \omega_m(n) - \hat{\omega}_m(n) \end{bmatrix}$$

The characteristic formula of a system represented by the equation (37) is given by the following equation (38), and an inherent value λ which is a solution to the equation (38) is calculated according to the following equation (39):

$$\lambda^2 - (2 - K1)\lambda + (1 - K1 + \Delta t \cdot K2) = 0 \quad (38)$$

$$\lambda = \frac{2 - K1 \pm \sqrt{K1^2 - 4\Delta t \cdot K2}}{2} \quad (39)$$

In order to bring the estimated angle $\hat{\theta}$ and the actual angle θ into conformity with each other, the absolute value of the inherent value λ which is calculated according to the equation (39) must be 1 or less. In order for the absolute value of the inherent value λ to be 1 or less, the gain K1 is required to be in the range of 0<K1<1, and the inherent value λ is placed on the actual axis if K2=(K1×K1)/4Δt. When K1=2 and K2=1/Δt, in particular, the system is finite and settled, and the difference (estimated error) between the estimated angle $\hat{\theta}$ and the actual angle θ becomes zero in two steps. By thus determining the gains K1, K2, the estimated error of the estimated angle $\hat{\theta}$ can be made zero.

If Δθn according to the following equation (40) is calculated using phase difference data depending on the phase difference (θ−$\hat{\theta}$) between the estimated angle $\hat{\theta}$ and the actual value θ of the rotor angle according to the equation (24), and the rotor angle θ is calculated by an observer expressed by the following equation (41) which is arranged to eliminate the phase difference (θ−$\hat{\theta}$), then the gain varies as the magnitude of the high-frequency components ($\sqrt{Vs^2+Vc^2}$) varies, and the stability is possibly impaired.

$$\Delta \theta n = \sqrt{\sqrt{Vs^2+Vc^2}} \cdot 2(\theta - \hat{\theta}) \quad (40)$$

$$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \sqrt{Vs^2 + Vc^2} \cdot 2(\theta(n) - \hat{\theta}(n)) \quad (41)$$

where K1, K2 represent calculating gains.

For preventing the stability damage, it is effective to use $\Delta\theta_1$ calculated according to the equation (25) as the phase difference data. If the angle detector 25 has a low calculating capability and takes some time in calculating the square root according to the equation (25), then the equation (25) may be approximated by the equation (26).

If a rotor angle θ is calculated by an observer constructed using the phase difference data $\Delta\theta_1$ calculated according to the equation (25) or (26) and the drive voltages VU, VV, VW applied to the motor 1 are controlled based on the rotor angle θ, then a bottom value D of the output torque of the motor 1, i.e., a lower end value of the varying range of the output torque, is lowered, tending to increase the pulsation of the output torque.

FIG. 4(a) is a graph showing the manner in which the bottom value D of the output torque of the motor 1 is lowered. The graph shown in FIG. 4(a) has a horizontal axis representing time (t), a right vertical axis representing the output torque (Tr) of the motor 1, and a left vertical axis representing the rotor angle (θ). In FIG. 4(a), a curve ⑥ represents the time-dependent transition of the output torque of the motor 1, and a curve ⑦ represents the time-dependent transition of the detected value of the rotor angle.

As shown in FIG. 4(a), the reason why the bottom value D of the output torque of the motor 1 is lowered is considered to be a detecting error of the rotor angle with respect to the actual value thereof. For this reason, the angle detector 25 detects a rotor angle with an observer constructed using phase difference data $\Delta\theta_2$ calculated according to the equation (27) with an offset value (offset) added thereto, thus forcibly shifting the detected value of the rotor angle for thereby reducing the detecting error of the rotor angle.

FIG. 4(b) is a graph showing the time-dependent transition of the output torque of the motor 1 at the time the drive voltages VU, VV, VW of the motor 1 is controlled based on the rotor angle which is calculated by the observer constructed using the phase difference data $\Delta\theta_2$ that is calculated with the offset value (offset) added thereto. As with FIG. 4(a), the graph shown in FIG. 4(b) has a horizontal axis representing time (t), a right vertical axis representing the output torque (Tr) of the motor 1, and a left vertical axis representing the rotor angle (θ). In FIG. 4(b), a curve ⑧ represents the time-dependent transition of the output torque of the motor 1, and a curve ⑨ represents detected values of the rotor angle.

As shown in FIG. 4(b), using $\Delta\theta_2$ as the phase difference data is highly effectively in suppressing a reduction in the output torque of the motor 1.

If the rotor angle θ is determined by follow-up calculations made by the observer, then the gain slightly varies when the parameters of the motor 1 vary. However, the gain variations do not cause problems to the estimation of the rotor angle θ if they are in a range not affecting the stability of the observer.

In the present embodiment, the sine reference value Vs is calculated by the equation (21), and the cosine reference value Vc is calculated by the equation (22). However, the sine reference value Vs may be calculated according to the following equation (42) or (43):

$$\int_0^{\frac{2\pi}{\omega}} Iu \cdot \sin\omega t \, dt = K \int_0^{\frac{2\pi}{\omega}} \left( -(1-m)\cos\omega t \cdot \sin\omega t - \frac{3\Delta 1}{2} \cos(2\theta - \omega t) \cdot \sin\omega t \right) dt + \int_0^{\frac{2\pi}{\omega}} Iudc \cdot \sin\omega t \, dt \quad (42)$$

$$= K \int_0^{\frac{2\pi}{\omega}} \left( -(1-m)\frac{\sin\omega t}{2} - \frac{3\Delta 1}{2}\sin 2\theta + \frac{\sin(2\theta - 2\omega t)}{2} \right) dt = \frac{2\pi}{\omega} \frac{3K\Delta 1}{4} \sin 2\theta$$

-continued $$\int_0^{\frac{2\pi}{\omega}} Iw \cdot \sin\left(\omega t + \frac{2}{3}\pi\right) dt = K \int_0^{\frac{2\pi}{\omega}} \left(-(1-m)\cos\left(\omega t + \frac{2}{3}\pi\right) \cdot \right. \tag{43}$$

$$\sin\left(\omega t + \frac{2}{3}\pi\right) - \frac{3\Delta 1}{2}\cos\left(2\theta - \omega t + \frac{2}{3}\pi\right) \cdot$$

$$\sin\left(\omega t + \frac{2}{3}\pi\right) dt + \int_0^{\frac{2\pi}{\omega}} Iudc \cdot$$

$$\sin\left(\omega t + \frac{2}{3}\pi\right) dt$$

$$= K \int_0^{\frac{2\pi}{\omega}} \left(-(1-m)\frac{\sin\left(\omega t - \frac{2}{3}\pi\right)}{2} - \right.$$

$$\left. \frac{3\Delta 1}{2}\sin\left(2\theta - \frac{2}{3}\pi\right) + \frac{\sin(2\theta - 2\omega t)}{2}\right) dt =$$

$$\frac{2\pi}{\omega}\frac{3K\Delta 1}{4}\sin\left(2\theta - \frac{2}{3}\pi\right)$$

The equations (42), (43) multiply a term not relating to the rotor angle θ and an orthogonal time function and integrates the product. While the equations (42), (43) can determine the sine reference value Vs, they are unable to calculate the cosine reference value Vc. However, with the cosine reference value Vc calculated by the following equation (44), a rotor angle can be detected by follow-up calculations of the observer according to the equations (23), (36).

$$-\frac{\int_0^{\frac{2\pi}{\omega}} Iw \cdot \sin\left(\omega t + \frac{2}{3}\pi\right) dt - \int_0^{\frac{2\pi}{\omega}} Iu \cdot \sin\omega t dt \cdot \cos\frac{2}{3}\pi}{\sin\frac{2}{3}\pi} \tag{44}$$

$$= -\frac{2\pi}{\omega}\frac{3K\Delta 1}{4}\sin\left(2\theta - \frac{2}{3}\pi\right) - \frac{\sin 2\theta \cos\frac{2}{3}\pi}{\sin\frac{2}{3}\pi}$$

$$= -\frac{2\pi}{\omega}\frac{3K\Delta 1}{4}\sin 2\theta \cos\frac{2}{3}\pi - \cos 2\theta \sin\frac{2}{3}\pi - \frac{\sin 2\theta \cos\frac{2}{3}\pi}{\sin\frac{2}{3}\pi}$$

$$= \frac{2\pi}{\omega}\frac{3K\Delta 1}{4}\cos 2\theta$$

While the U-phase of the motor 1 is used as the first phase and the W-phase of the motor 1 as the second phase in the present invention, the first and second phases may be another combination of phases of the motor 1.

When the power drive unit 22 controls the voltages applied to the armatures of the motor 1 by way of PWM, PWM carriers in the phases U, V, W which are usually in phase with each other can be given at 120°-apart different angles for detecting the rotor angle θ using high-frequency components contained in the PWM carriers. In this case, the power drive unit 22 performs the function of the high-frequency voltage imposing means, and hence the high-frequency voltage imposer 21 is dispensed with.

Although a certain preferred embodiment of the present invention has been shown and described in detail, it should be understood that various changes and modifications may be made therein without departing from the scope of the appended claims.

What is claimed is:

1. A rotor angle apparatus for a DC brushless motor, comprising:

voltage applying means for applying drive voltages to three-phase armatures of a salient-pole DC brushless motor;

high-frequency voltage imposing means for imposing high-frequency voltages to said drive voltages, respectively;

first current detecting means for detecting a current flowing through a first-phase armature among said three-phase armatures;

second current detecting means for detecting a current flowing through a second-phase armature among said three-phase armatures;

reference value extracting means for extracting a sine reference value depending on a sine value which is twice the rotor angle of said DC brushless motor and a cosine reference value depending on a cosine value which is twice the rotor angle of said DC brushless motor, using a first current value detected by said first current detecting means and a second current value detected by said second current detecting means when said high-frequency voltages are imposed on said drive voltages by said high-frequency voltage imposing means, and high-frequency components depending on said high-frequency voltages; and rotor angle calculating means for calculating the rotor angle of said DC brushless motor from said sine reference value and said cosine reference value.

2. A rotor angle detecting apparatus according to claim 1, wherein said reference value extracting means effects an integrating process or a low-pass filtering process on said high-frequency components to extract said sine reference value and said cosine reference value.

3. A rotor angle detecting apparatus according to claim 1 or 2, wherein said rotor angle calculating means calculates phase difference data representing a phase difference (θ−θ̂) between an estimated value (θ̂) and an actual value (θ) of the rotor angle of said DC brushless motor, using said sine reference value and said cosine reference value, and calculates said rotor angle according to follow-up calculations using an observer which is constructed to eliminate said phase difference (θ−θ̂) represented by said phase difference data.

4. A rotor angle detecting apparatus according to claim 2, wherein said reference value extracting means calculates the following equations (45), (46) as said integrating process:

$$Vs = \int_0^{\frac{2\pi}{\omega}} \left\{\cos 2\omega t \cos\left(\omega t + \frac{2}{3}\pi\right) \cdot Iu - \cos 2\omega t \cos\omega t \cdot Iw\right\} dt \tag{45}$$

$$Vc = -\int_0^{\frac{2\pi}{\omega}} \left\{\sin 2\omega t \cos\left(\omega t + \frac{2}{3}\pi\right) \cdot Iu - \sin 2\omega t \cos\omega t \cdot Iw\right\} dt \tag{46}$$

where Vs: said sine reference value, Vc: said cosine reference value, Iu: said first current value, Iw: said second current value, and ω: the angular velocity of said high-frequency voltages.

5. A rotor angle detecting apparatus according to claim 4, wherein said rotor angle calculating means generates phase difference data representing a phase difference (θ−θ̂) between an estimated value (θ̂) and an actual value (θ) of the rotor angle of said DC brushless motor according to the following equation (48) while said high-frequency voltages are imposed on said drive voltages by said high-frequency voltage imposing means and said sine reference value and said cosine reference value are extracted by said reference value extracting means in each control cycle, calculates the rotor angle of said DC brushless motor according to the following equation (47) in a first control cycle, and, in next and following control cycles, uses the rotor angle of said DC brushless motor calculated in a preceding control cycle as an estimated value ($\hat{\theta}$) for the rotor angle of said DC brushless motor in the preceding control cycle, updates the estimated value ($\hat{\theta}$) for the rotor angle of said DC brushless motor with an observer which sequentially updates and calculates the estimated value ($\hat{\theta}$) for the rotor angle of said DC brushless motor based on said phase difference data to eliminate said phase difference ($\theta - \hat{\theta}$) depending on said phase difference data calculated in the preceding control cycle, thereby to calculate an estimated value ($\hat{\theta}$) for the rotor angle of said DC brushless motor in a present control cycle, and uses the estimated value ($\hat{\theta}$) for the rotor angle as the rotor angle of said DC brushless motor:

$$\theta = \frac{1}{2}\tan^{-1}\frac{Vs}{Vc} \quad (47)$$

$$Vs \cdot \cos 2\hat{\theta} - Vc \cdot \sin 2\hat{\theta} = \sqrt{Vs^2 - Vc^2}\sin(2\theta - 2\hat{\theta}) \quad (48)$$
$$\approx \sqrt{Vs^2 - Vc^2} \cdot 2(\theta - \hat{\theta})(\text{in case } \theta - \hat{\theta} \approx 0)$$

where $\hat{\theta}$: the estimated value for the rotor angle of said DC brushless motor, $\theta$: the actual value of the rotor angle of said DC brushless motor.

6. A rotor angle detecting apparatus according to claim 5, wherein said rotor angle calculating means uses $\Delta\theta_1$ calculated according to the following equation (49) as said phase difference data:

$$\Delta\theta_1 = 2(\theta - \hat{\theta}) \approx \sin(2\theta - 2\hat{\theta}) \quad (49)$$
$$= \frac{Vs \cdot \cos 2\hat{\theta} - Vc \cdot \sin 2\hat{\theta}}{\sqrt{Vs^2 + Vc^2}}$$

where $\Delta\theta_1$: said phase difference data.

7. A rotor angle detecting apparatus according to claim 6, wherein said rotor angle calculating means calculates said phase difference data $\Delta\theta_1$ based on approximating calculations according to the following equation (50) instead of the equation (49):

$$\Delta\theta_1 = 2(\theta - \hat{\theta}) \approx \sin(2\theta - 2\hat{\theta}) \quad (50)$$
$$\approx \begin{cases} \frac{Vs \cdot \cos 2\hat{\theta} - Vc \cdot \sin 2\hat{\theta}}{|Vs|}(|Vs| > |Vc|) \\ \frac{Vs \cdot \cos 2\hat{\theta} - Vc \cdot \sin 2\hat{\theta}}{|Vc|}(|Vc| > |Vs|) \end{cases}$$

where $\Delta\theta_1$: said phase difference data.

8. A rotor angle detecting apparatus according to claim 5, wherein said rotor angle calculating means uses $\Delta\theta_2$ calculated according to the following equation (51) as said phase difference data:

$$\Delta\theta_2 = 2(\theta - \hat{\theta}) + \text{offset} \approx \sin(2\theta - 2\hat{\theta}) + \text{offset} \quad (51)$$
$$= \frac{Vs \cdot \cos 2\hat{\theta} - Vc \cdot \sin 2\hat{\theta}}{\sqrt{Vs^2 + Vc^2}} + \text{offset}$$

where $\Delta\theta_2$: said phase difference data, offset: an offset value.

9. A rotor angle detecting apparatus according to any one of claims 1, 2, 4, 5, 6, 7, and 8, further comprising:

correlation data storage means for handling said DC brushless motor as an equivalent circuit having a q-axis armature disposed on a q-axis extending in the direction of magnetic fluxes of field magnetic poles of the rotor of said DC brushless motor and a d-axis armature disposed on a d-axis extending perpendicularly to the q-axis, and storing, in advance, data of a map or a relational equation representing a correlation between a rotor angle of said DC brushless motor which is calculated by said rotor angle calculating means while a predetermined magnetic pole determining current is passed through said q-axis armature, and a threshold established between a saturated reference value which is calculated by a predetermined calculating process depending on said sine reference value and said cosine reference value which are extracted by said reference value extracting means when said rotor is in a saturated state in which the direction of a magnetic field generated by said q-axis armature and the direction of a magnetic field generated by magnetic poles of said rotor are the same as each other when said rotor angle is calculated, and an unsaturated reference value which is calculated by said predetermined calculating process depending on said sine reference value and said cosine reference value which are extracted by said reference value extracting means when said rotor is in an unsaturated state in which the direction of the magnetic field generated by said q-axis armature and the direction of the magnetic field generated by the magnetic poles of said rotor are opposite to each other when said rotor angle is calculated; and magnetic pole direction determining means for handling said DC brushless motor as said equivalent circuit, and comparing a threshold value depending on said rotor angle which is obtained when the rotor angle calculated by said rotor angle calculating means while said magnetic pole determining current is passed through said q-axis armature is applied to said map or said relational equation, with a magnetic pole determining value calculated according to said predetermined calculating process depending on said sine reference value and said cosine reference value which are extracted by said reference value extracting means when said rotor angle is calculated, thereby to determine whether said rotor is in said saturated state or said unsaturated state for determining the direction of the magnetic poles of said rotor.

* * * * *